Aug. 13, 1940.                J. E. SMITH                2,211,520
                        ELECTRICAL HEATING UNIT
                         Filed Dec. 31, 1937
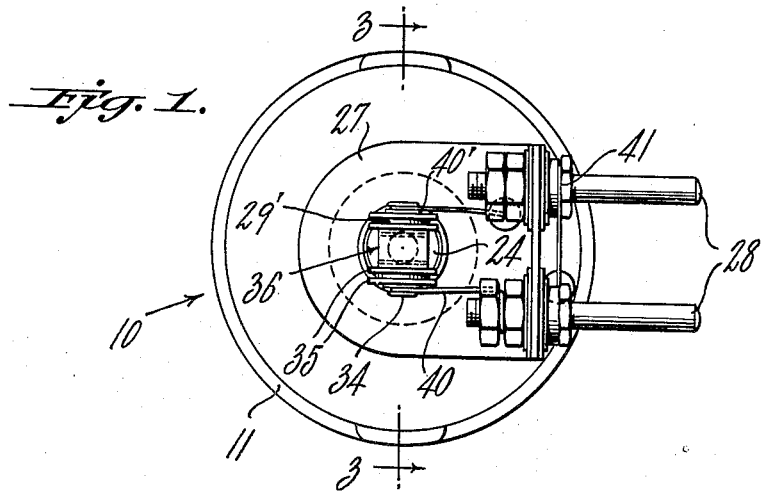
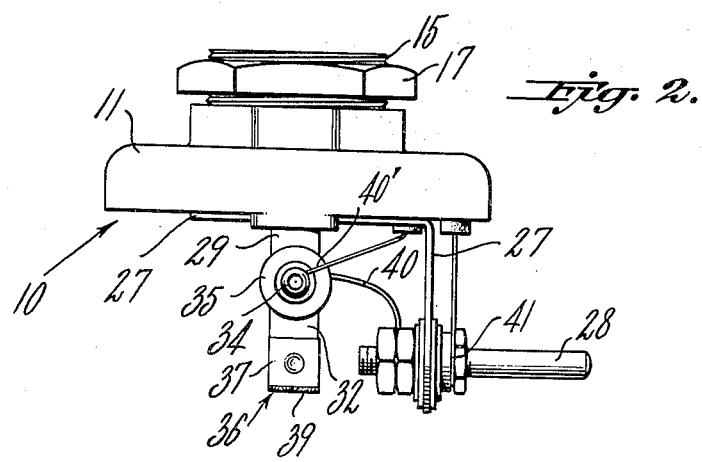
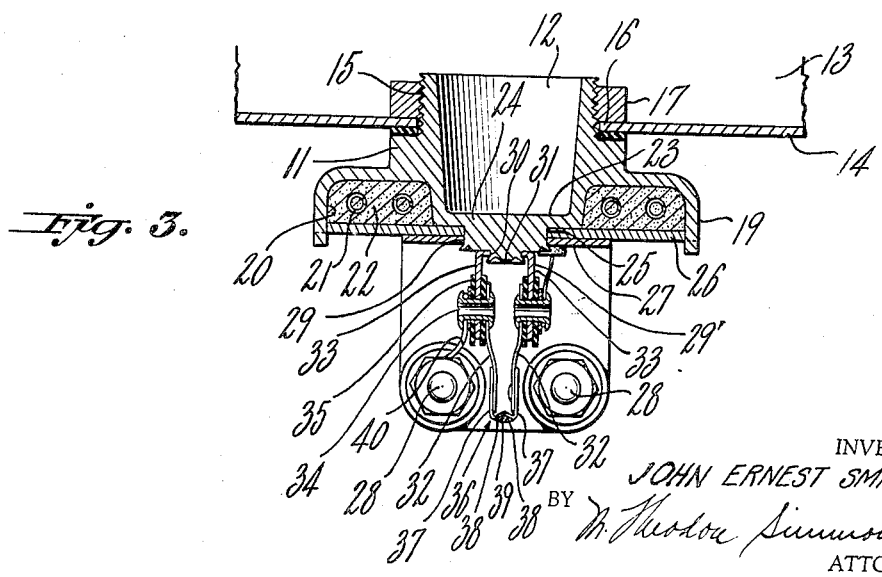
INVENTOR.
JOHN ERNEST SMITH
BY
ATTORNEY.

Patented Aug. 13, 1940

2,211,520

UNITED STATES PATENT OFFICE 2,211,520

ELECTRICAL HEATING UNIT

John E. Smith, Plainfield, N. J.

Application December 31, 1937, Serial No. 182,712

6 Claims. (Cl. 219—44)

This invention relates to electrical heating devices, and more particularly to a heating unit adapted for installation in a heating vessel such as a coffee percolator.

One of the features of this invention is the combination of a heating element surrounding a water well communicating with a body of fluid to be heated in the vessel, and a fuse associated with the heating element and its housing so as to quickly follow temperature changes therein, and therefore capable of blowing out in time to prevent destructive temperature rises in the heating element and the adjacent portions of the heating device. Heretofore, fuses have failed to accomplish this end because they depended upon temperatures subject to very great variations, and therefore were unreliable gages as a consequence of their delayed action. As an example of such delayed fuse action, the fuses used prior to this time were usually located in or near a base portion of the heating vessel, and dangerous temperatures arising in the heating element or its housing had to be transmitted long distances to reach the fuse, or the fuse had to have such a high melting point that it would not respond to protect the heating element and associated parts, and the soldered parts of the percolator body or other vessel.

Another feature is the provision of a mounting for the fuse on a short lug extension beneath the water well and closely adjacent to the heating element and the enclosing portions of the housing thereof, which reduces to a minimum the distance between the heating element and the fuse and therefore renders it more quickly responsive to temperature changes of the parts it is designed to protect.

Various other features of advantage will appear as the description proceeds, reference being made to the accompanying drawing in which:

Fig. 1 is a bottom plan view of a heating unit embodying my invention,

Fig. 2 is a side elevation thereof, and

Fig. 3 is a vertical section on the line 3—3 of Fig. 1 showing the unit installed in the bottom of a heating vessel such as a percolator.

In the drawing the reference numeral 10 indicates a heating unit having a housing 11 constructed of material having high thermal conductivity such as aluminum. A water well 12 is provided in the body of the housing for communication with the interior 13 of a coffee percolator or other heating vessel 14. For convenience in mounting the housing in the vessel 14 may be reduced and threaded as indicated at 15 for extension through an opening 16 in the vessel, and a nut 17 on the threaded extension tightened against the inner face of the vessel surrounding the opening 16 to hold the metal wall of the vessel clamped between the nut 17 and a shoulder extending circumferentially beneath the reduced and threaded part 15.

The lower part of the housing 11 is enlarged as shown at 19 and formed with a circular channel 20 for reception of a heating element of suitable resistance wire 21 embedded in ceramic or other appropriate insulating material 22.

The base portion 23 beneath the well has a lug extension 24 which projects through an opening 25 in a plate 26 covering the ceramic material 22. A bracket 27 carrying terminal means such as posts 28 for connection to a service plug, has an opening 29 for the lug which is swaged or riveted over the under part of the bracket 27 to rigidly secure the same and the covering plate 26 to the housing 11.

In order to protect the heating element and the low fusing metal of the housing against destructive high temperatures a fuse is provided beneath the well 12 and closely adjacent the heating element 21 so that the fuse will respond quickly to temperature changes in the heating element and the surrounding portions of the housing. For this purpose a U-shaped or two-legged mounting piece 29' preferably of copper, having an opening 30 for a reduced extension 31 of the lug 24 is rigidly secured to the housing 11 beneath the water well by swaging or riveting the lug extension 31 against the outer face of the mounting piece.

A pair of spring blades 32 are secured to the opposite legs 33 of the mounting piece 29' by rivets 34, and suitable insulating washers 35 are interposed between the blades 32 and the metal portions of the mounting to prevent electrical contact between these parts.

The free ends of the blades 32 project downward in side-by-side relation from the mounting piece 29' and are held toward each other under spring tension by a U-shaped fuse element 36 comprising a pair of metal members 37 having inturned portions 38 held together by fuse metal 39. A conductor 40 connects one of the blades 32 to the left terminal post 28 as viewed in Fig. 3. One end 40' of the heating element 21 is connected to the other fuse-holding blade. The remaining end of the heating element is connected to the other terminal post as shown at 41 in Fig. 2.

It is seen from the foregoing construction that the heating element surrounding the well 12 is enabled to rapidly transfer heat to the liquid contents of the heating vessel owing to its close proximity to the liquid, and that the heating element is also in close thermal communication with the copper mounting piece 29' and the fuse element 36. The thickness of intervening metal between these parts is small and the transfer of heat is consequently very rapid. The heat reaching the fuse is therefore directly conducted and effects the fuse as a result of temperatures of the well and not as a result of reflected heat. Therefore, even slight variations of temperature in and near the heating element are quickly reached in the fuse. Under these conditions the fuse is an accurate gage of thermal conditions in the heating unit, and provides dependable protection against destructive temperature rises either in the heating element itself or in the various parts of the low fusing housing surrounding the element and enclosing the water well.

The housing and its associated parts comprise a self contained unit which may be readily installed in any heating vessel by merely providing a suitable opening for the threaded extension of the housing. All electrical connections are carried by the unit, and therefore requires no wiring to be done by the manufacturer of the heating vessel to install the unit.

It is to be understood that the invention is capable of various other forms of construction and modification without departing from the principles set forth above, and is therefore not to be limited in its applications except as defined in the appended claims.

I claim:

1. An electrical heating unit, comprising a housing containing a heating element surrounding a water well, a lug on said housing at the base of the well, a metal bracket of high thermal conductivity fast to said lug, and a fuse mount carried by the bracket, the lug and the bracket being effective to rapidly conduct heat from the portions of the housing surrounding the heating element, to a fuse carried by the mount, a pair of terminals, and electrical connections from the fuse mount to one of the terminals and to one end of the heating element.

2. An electrical heating unit, comprising a housing containing a heating element surrounding a water well, a lug on said housing at the base of the well, a bracket having an opening through which the lug extends, the lug being swaged over the portions of the bracket around the opening therein, said lug also having a downward extension of reduced diameter, a fuse mounting having an opening for said extension, the latter being swaged over to hold said mounting to the lug, a fuse carried by said mounting, terminal means on said bracket, and electrical connections between the fuse, the heating element, and said terminal means.

3. An electrical heating unit, comprising a housing having a channel surrounding a water well, a heating element embedded in ceramic insulating material in said channel, a plate covering the insulating material, a lug on the housing beneath the well and extending through an opening in the plate, the lug being swaged over the plate, a fuse mounting secured to the end of the lug, a fuse carried by the mounting, terminal means associated with the housing, and electrical connections between the heating element, the fuse, and said terminal means.

4. An electrical heating unit, comprising a housing having a water well, means for connecting the housing to a heating vessel with the well opening into the interior thereof, a heating element surrounding the well, a metal bracket mounted on the housing beneath the well and closely adjacent the heating element, a pair of spring blades secured to and insulated from the metal bracket, and a U-shaped fuse element engaged over the free ends of said spring blades and holding them pressed toward each other against spring tension.

5. An electrical heating unit comprising a housing containing a heating element surrounding a water well, a lug on said housing adjacent the base of the well, a terminal bracket secured to the lug, a fuse mounting also secured to said lug, a fuse carried by the mounting, terminal means on said bracket, and electrical connections between the fuse, the heating element and said terminal means.

6. An electrical heating unit comprising a housing containing a heating element surrounding a water well, the housing having a reduced portion forming a shoulder, the reduced portion being screw threaded and arranged to extend through the wall of a heating vessel, and a nut fitting upon the screw threaded portion for securing the unit in place with the wall thereof against said shoulder, and the well opening to the interior of said vessel, a lug on the housing adjacent the well and the heating element, a fuse mount depending from said lug, a pair of terminals, and electrical connections between the fuse, the heating element and said terminal means.

JOHN E. SMITH.